United States Patent [19]

Silva et al.

[11] 4,411,750

[45] Oct. 25, 1983

[54] CATION EXCHANGE MEMBRANE WITH HIGH EQUIVALENT WEIGHT COMPONENT

[75] Inventors: Raimund H. Silva, Hattingen, Fed. Rep. of Germany; Roger A. Smith, Kennett Square, Pa.

[73] Assignee: E. I. Du Pont de Nemours and Company, Wilmington, Del.

[21] Appl. No.: 420,509

[22] Filed: Sep. 20, 1982

Related U.S. Application Data

[60] Division of Ser. No. 317,280, Nov. 2, 1981, and a continuation-in-part of Ser. No. 225,652, Jan. 16, 1981, abandoned.

[51] Int. Cl.$^3$ .......................... C25B 1/34; C25B 9/00; C25B 13/08

[52] U.S. Cl. ........................................ 204/98; 204/128; 204/252; 204/296

[58] Field of Search .................. 204/296, 98, 128, 252

[56] References Cited

U.S. PATENT DOCUMENTS

| 4,123,336 | 10/1978 | Seko et al. ........................ 204/98 |
| 4,284,460 | 8/1981 | Moore et al. ........................ 204/296 |
| 4,331,521 | 5/1982 | Chisholm et al. ................... 204/296 |

*Primary Examiner*—R. L. Andrews

[57] ABSTRACT

Composite fluorocarbon cation exchange membrane having at least two layers of fluorinated polymer containing pendant side chains with sulfonyl groups wherein the equivalent weight of one such layer differs from the adjacent layer by at least 100.

5 Claims, No Drawings

CATION EXCHANGE MEMBRANE WITH HIGH EQUIVALENT WEIGHT COMPONENT

CROSS-REFERENCE TO RELATED APPLICATION

This is a division of application Ser. No. 317,280, filed on Nov. 2, 1981 and a continuation-in-part of copending application Ser. No. 225,652, filed Jan. 16, 1981 now abandoned.

BACKGROUND OF THE INVENTION

Fluorinated polymers containing pendant side chains are often used to prepare ion exchange membranes. Such membranes have outstanding properties as barrier membranes to separate the anode and cathode compartments of electrolytic cells used for the production of chlorine and caustic.

Fluorinated polymers containing carboxyl side chains provide excellent current efficiency in such electrolytic cells, but result in high operating voltages. By contrast, fluorinated polymers containing sulfonyl groups in the side chains permit operation at low voltages, but result in poor current efficiency in the electrolytic cell.

It has previously been recognized that combinations of polymers having sulfonyl and carboxyl groups are desirable to provide an optimum balance of performance characteristics in an electrolytic cell using membranes prepared from such polymers. Under normal cell operation, the water permeation characteristics of the layers are sufficiently close that the layers remain in intimate contact with each other. However, abnormal cell conditions, such as loss of electrical power, failure of water feed to the cathode chamber and particularly interruption or loss of brine feed to the cell, can produce a large difference in water transport. For example, if the anolyte is depleted below 50 g/l NaCl, a large quantity of water will be transported through the fluorinated polymer having the sulfonyl side chains. However, the water is substantially less able to permeate a polymer having carboxyl-containing side chains. Thus, during an upset of cell operation, a composite of two such polymers may experience a buildup of water at the interface, resulting in delamination of the composite.

SUMMARY OF THE INVENTION

The instant invention provides composite cation exchange membrane exhibiting improved resistance to delamination in an electrolytic cell and a process for the production of such composite membranes.

Specifically, the instant invention provides a multilayer cation exchange membrane consisting essentially of layers of (a) fluorinated polymer with pendant side chains containing carboxyl groups, (b) fluorinated polymer having pendant side chains containing sulfonyl groups and having an equivalent weight of about from 1100 to 1600 and at least about 200 units higher than layer (a), and (c) a fluorinated polymer having pendant side chains containing sulfonyl groups and having an equivalent weight that is about from 1000 to 1500 and at least about 100 units lower than layer (b), the layers being bonded together in the order specified.

Preferably, the cation exchange membrane further comprises a reinforcing fabric embedded in the lower equivalent weight fluoropolymer containing sulfonic functional groups.

DETAILED DESCRIPTION OF THE INVENTION

The polymers used in the instant invention are of the types generally used previously in the preparation of films for use in electrochemical cells, and especially chloralkali cells. These include fluorinated polymers with pendant side chains containing sulfonyl groups or carboxyl groups. These sulfonyl or carboxyl functional groups are generally present in such a form as to render the polymer melt-fabricable.

The melt-fabricable polymer having sulfonyl functional groups has a fluorinated hydrocarbon backbone chain to which are attached functional groups or pendant side chains bearing the functional groups. The pendant side chains can contain, for example,

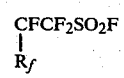

groups wherein $R_f$ is F, Cl, or a $C_1$ to $C_{10}$ perfluoralkyl radical. Fluorinated polymers of this type and their preparation are described in detail in U.S. Pat. Nos. 3,282,875, 3,560,568, 3,718,627, and 3,041,317, all of which are hereby incorporated by reference. For chloralkali cells, perfluorinated polymers are preferred.

The melt-fabricable polymer having carboxylic functional groups has a fluorinated hydrocarbon backbone chain to which are attached the functional groups or pendant side chains which in turn carry the functional groups. The pendant side chains can contain, for example,

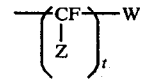

groups wherein Z is F or $CF_3$, t is 1 to 12, and W is —COOR or —CN, wherein R is lower alkyl. Preferably, t is 1 to 3. Preferably, the functional group in the side chains of the polymer will be present in terminal

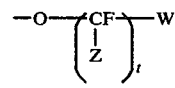

groups. Such fluorinated polymers containing carboxylic functional groups and their preparation are disclosed in British Patent No. 1,145,445 and U.S. Pat. Nos. 3,506,635 and 4,116,888, all hereby incorporated by reference. Preferred monomers for use in the preparation of such polymers are found in U.S. Pat. Nos. 4,131,470 and 3,852,326, also hereby incorporated by reference. For chlor-alkali cells, perfluorinated polymers of this type are preferred.

In general, the polymers having carboxylic functional groups exhibit an equivalent weight of about from 500 to 1500, and preferably from about 900 to 1200. The polymers having sulfonyl groups exhibit an equivalent weight of about from 1100 to 1600. The lower equivalent weight polymer having sulfonyl groups should be at least about 100 units lower than the adjacent polymer, and accordingly has an equivalent weight of about from 1000 to 1500. In addition, the higher molecular weight polymer having sulfonyl groups should have an equivalent weight at least about 200 units higher than the polymer having carboxylic functional groups. This difference in equivalent weights permits the operation of an electrolytic cell at lower brine concentration than would otherwise be possible.

The particular method of preparing the laminates of the instant invention is not critical, so long as the basic arrangement of carboxylic polymer, high equivalent weight sulfonic polymer and low equivalent weight sulfonic polymer is maintained.

Accordingly, the component layers can be preformed into film and subsequently laminated. Laminating techniques which can be used for this process are disclosed in detail in South African Patent No. 78/2225, hereby incorporated by reference. Another apparatus which can be used is the horizontal laminator shown in U.S. Pat. No. 3,770,567, also hereby incorporated by reference.

An alternative method of preparing the present laminar structures is by coextruding the polymers above the melting point of each polymer. A wide variety of mechanical variations can be used, including commercially available coextrusion equipment such as that manufactured by Johnson Plastics Machinery Company of Chippewa Falls, Wisconsin. For example, the laminates can be prepared using multiple extruders feeding into separate zones of a common chamber, following which the layered stream is fed to a single die. Another embodiment of the present invention involves the use of a single die known in the film processing industry as a "coat hanger" die. In the use of such a die, multiple extruders feed separate streams into the specialized die. The die expands the width of the streams and joins the streams before they leave a single exit orifice of the die.

Within the requirement that the polymers be above the melting point, the particular processing temperature will depend on known operational requirements for extrusion of films. The temperature will be adjusted to obtain continuous smooth films of uniform caliper without die drip or other defects. Using the sulfonyl-containing and carboxyl-containing polymers of the present invention, an extrusion temperature range of about from 260° to 330° C. is preferred.

A reinforcing layer can also be added to the composite structure if desired. A wide variety of support materials can be used, including woven fabric or nonwoven material. In the case of woven fabric, weaves such as ordinary basket weave and leno weave can be used. The reinforcement threads can be either monofilament or multistranded.

Particularly preferred reinforcement materials are perhalocarbon polymer threads. As used herein, the term "perhalocarbon polymer" means a polymer which has a carbon chain optionally containing ether linkages and which is totally substituted by fluorine or by fluorine and chlorine atoms. Particularly preferred because of its inert character is a perfluorocarbon polymer. Typical of such polymers are those made from tetrafluoroethylene and copolymers of tetrafluoroethylene with hexafluoropropylene and/or perfluoro(alkyl vinyl ethers) wherein alkyl is from 1 to 10 carbon atoms. A preferred ether of this type is perfluoro(propyl vinyl ether).

The reinforcing material can be conveniently applied to the outer sulfonyl-containing polymer in conjunction with another sulfonyl-containing polymer of the same equivalent weight. These two sulfonyl-containing polymers can then be laminated, with the reinforcing material embedded in the composite layer of lower equivalent weight, sulfonyl-containing polymer.

After preparation of the laminates, they are cooled to a temperature below the melting point of each polymer and treated according to known techniques to convert the functional groups to forms more suitable for use in electrolytic cell applications. Such conversion also renders the polymers substantially less melt-fabricable.

The composite membranes of the present invention exhibit excellent performance as a membrane in an electrochemical cell, especially an electrolytic cell used for the production of chlorine and caustic. The membranes, at the same time, exhibit improved resistance to delamination in use, even under conditions of low anolyte sodium chloride concentration. When the sodium chloride concentration in the anolyte is sufficiently low and other cell conditions are such as to promote delamination, the frequency of delamination and the area of delamination of the present membranes is less than that experienced with membranes composed of a carboxyl film and a sulfonyl film of only one equivalent weight.

The instant invention is further illustrated by the following specific examples.

EXAMPLE 1

Fluoropolymers having carboxyl and sulfonyl groups were prepared according to the procedures of U.S. Pat. Nos. 4,131,740 and 3,282,875, respectively. Films were prepared from the polymers to give a two-mil film of carboxylic ester copolymer having an equivalent weight of 1,080, a 1.4 mil sulfonyl fluoride copolymer having an equivalent weight of 1,350, and a 2 mil film of a sulfonyl fluoride copolymer having an equivalent weight of 1,100.

The carboxylic film, the high equivalent weight sulfonyl film and the low equivalent weight sulfonyl film were pressed together to exclude air between layers and then laminated with a reinforcing cloth and another 2 mil film of the low equivalent weight sulfonyl copolymer. The reinforcing cloth consisted of 200-denier extruded monofilament of a copolymer of 96 weight percent tetrafluoroethylene and 4 weight percent perfluoro(propyl vinyl ether) prepared in accordance with Comparison C of U.S. Pat. No. 4,029,868. The thread had a circular cross-section with a diameter of 127 microns (5 mils) and an aspect ratio of 1. The cloth was a leno weave with a warp thread count of 13.8 threads per centimeter and a weft thread count of 6.7 threads per centimer. The cloth was hot calendered so that the total thickness of the cloth was 239 microns (9.4 mils). The threads were slightly flattened at the cross-over points with the thread aspect ratio increased from 1 to 1.13.

The four films and reinforcing cloth were continuously laminated on a horizontal laminator at a temperature which varied from 230° to 240° C. and using a turning drum. The final composite had a size of one square foot. A piece of this composite was hydrolyzed for 1 hour at 80° C. in a standard hydrolysis bath. The bath was composed of potassium hydroxide, dimethylsulfoxide and water in a ratio of 12%, 30% and 50% by weight, respectively. It was washed in water and mounted in a 4-inch diameter NaCl electrolysis cell. Performance was as follows:

| Days on Line | NaOH/% | NaCl/% | Cl/PPM* | CE/% | Voltage | PC (KWH/MT) |
|---|---|---|---|---|---|---|
| 2 | 30.5 | 18.0 | 31 | 91.5 | 3.80 | 2775 |
| 3 | 31.4 | | | 96.4 | 3.82 | 2645 |
| 4 | 31.8 | 18.9 | | 96.3 | 3.83 | 2656 |
| 8 | 31.8 | 18.2 | | 96.1 | 3.80 | 2640 |
| 9 | 29.7 | 13.1 | 262 | 95.3 | 3.73 | 2614 |
| 10 | 27.4 | | | 90.4 | 3.71 | 2741 |
| 11 | 28.3 | 11.8 | 63 | 91.1 | 3.71 | 2721 |
| 15 | 30.0 | 11.1 | | 91.8 | 3.77 | 2742 |
| 16 | 31.6 | | 41 | 93.3 | 3.80 | 2720 |
| 17 | 31.5 | | | 93.0 | 3.81 | 2738 |
| 18 | 31.7 | 11.5 | | 93.0 | 3.83 | 2751 |

*In NaOH corrected to 50%

At a brine concentration as low as 11.1%, only slight drop in performance was observed. The chloride content in the caustic was low at these low brine concentrations. The membrane blistered after approximately 20 days on line due to a feed brine stoppage since the anolyte NaCl concentration was already low.

EXAMPLE 2

The general procedure of Example 1 was repeated. Performance and conditions after 60 days on line at 31 amps/dm$^2$ were as follows:
33% NaOH
18.2% NaCl in anolyte
80° C.
94.9% Current Efficiency
3.87 Volts
2725 KWH/MT NaOH

EXAMPLE 3

The general procedure of Example 1 was repeated, except that the films and the reinforcing fabric were laminated on a horizontal laminator at a temperature of from 240° to 250° C.

The membrane, after hydrolysis, was tested as in Example 1. Cell performance after 22 days on line at 3.1 KA/m$^2$ was as follows:
30.5% NaOH
17.2% NaCl in anolyte
79.0° C.
95.54% current efficiency
3.95 volts
2761 KWH/MT

We claim:

1. In a process for the continuous production of alkali metal hydroxide which comprises continuously providing an aqueous alkali metal halide solution to the anode compartment of an electrolytic cell having an anode, a cathode, and a cation exchange membrane separating the anode and the cathode; electrolyzing the solution; and continuously removing alkali metal hydroxide solution, hydrogen, and halogen from the electrolytic cell, the improvement wherein the cation exchange membrane consists essentially of layers of
   (a) fluorinated polymer with pendant side chains containing carboxyl groups,
   (b) fluorinated polymer having pendant side chains containing sulfonyl groups and having an equivalent weight of about from 1100 to 1600 and at least about 200 units higher than layer (a), and
   (c) fluorinated polymer having pendant side chains containing sulfonyl groups and having an equivalent weight that is about from 1000 to 1500 and at least about 100 units lower than layer (b), the layers being bonded together in the order specified.

2. A process of claim 1 wherein the cation exchange membrane further comprises a reinforcing fabric embedded in the lower equivalent weight fluoropolymer containing sulfonic functional groups.

3. In an electrolytic cell having an anode, a cathode, and a cation exchange membrane separating the anode and the cathode, the improvement wherein the cation exchange membrane consists essentially of layers of
   (a) fluorinated polymer with pendant side chains containing carboxyl groups,
   (b) fluorinated polymer having pendant side chains containing sulfonyl groups and having an equivalent weight of about from 1100 to 1600 and at least about 200 units higher than layer (a), and
   (c) fluorinated polymer having pendant side chains containing sulfonyl groups and having an equivalent weight that is about from 1000 to 1500 and at least about 100 units lower than layer (b), the layers being bonded togehter in the order specified.

4. An electrolytic cell of claim 3 wherein the cation exchange membrane further comprises a reinforcing fabric embedded in the lower equivalent weight fluoropolymer containing sulfonic functional groups.

5. A process of claim 1 wherein the cation exchange membrane further comprises a reinforcing fabric embedded in the lower equivalent weight fluoropolymer containing sulfonic functional groups.

* * * * *

UNITED STATES PATENT OFFICE
CERTIFICATE OF CORRECTION

PATENT NO. : 4,411,750
DATED : October 25, 1983
INVENTOR(S) : R. H. Silva and R. A. Smith It is certified that error appears in the above-identified patent and that said Letters Patent are hereby corrected as shown below:

At column 6, lines 26-48, delete Claims 3-5, inclusive, in their entirety.

Signed and Sealed this

Seventh Day of August 1984

[SEAL]

Attest:

GERALD J. MOSSINGHOFF

Attesting Officer     Commissioner of Patents and Trademarks